United States Patent [19]

Allard et al.

[11] Patent Number: 4,743,964

[45] Date of Patent: May 10, 1988

[54] METHOD AND DEVICE FOR RECORDING AND RESTITUTION IN RELIEF OF ANIMATED VIDEO IMAGES

[75] Inventors: Jean-Claude Allard, Bourg La Reine; Christian Saunier, Ermont, both of France

[73] Assignee: Giravions Dorand, Suresnes, France

[21] Appl. No.: 763,348

[22] Filed: Aug. 7, 1985

[30] Foreign Application Priority Data

Aug. 10, 1984 [FR] France ................................ 84 12694

[51] Int. Cl.⁴ ...................... H04N 13/00; H04N 15/00
[52] U.S. Cl. ......................................... 358/88; 358/3; 358/91; 358/310; 358/335
[58] Field of Search ................. 358/3, 88, 91, 92, 310, 358/335; 352/59

[56] References Cited

U.S. PATENT DOCUMENTS

| | | | |
|---|---|---|---|
| 3,251,933 | 5/1966 | Beste | 358/92 |
| 3,670,097 | 6/1972 | Jones | 358/91 |
| 4,510,525 | 4/1985 | Kuperman et al. | 358/92 |

FOREIGN PATENT DOCUMENTS

| | | | |
|---|---|---|---|
| 894099 | 12/1944 | France | 352/59 |
| 0109492 | 7/1982 | Japan | 358/3 |

Primary Examiner—Howard Britton
Assistant Examiner—John K. Peng
Attorney, Agent, or Firm—Bucknam and Archer

[57] ABSTRACT

An animated scene viewed simultaneously at two different angles is recorded in the form of video signals on two videodisks which thus contain after recording a sequence of left-hand images and a sequence of right-hand images respectively. The images are restituted in synchronism by two readers, the signals of which are transmitted for visual display to two monitors associated with mirrors for reflecting the displayed images respectively to the left eye and to the right eye of a viewer.

5 Claims, 2 Drawing Sheets

FIG_1

METHOD AND DEVICE FOR RECORDING AND RESTITUTION IN RELIEF OF ANIMATED VIDEO IMAGES

BACKGROUND OF THE INVENTION

1. Field of the Invention

The present invention relates to techniques for recording animated pictures in the form of video signals, then subsequently restituting them from the recorded signals in the form of stereoscopic animated images or pictures which the observer sees in relief.

2. Description of the Prior Art

The problem of reproduction of animated pictures in stereoscopy has often claimed the attention of research workers and inventors alike. Among the solutions considered, it has been proposed in particular to superimpose two motion-picture images picked up simultaneously at different angles corresponding to the spacing of the two eyes of a viewer and to observe these superimposed images through eyeglasses equipped with corresponding filters. Three-dimensional vision is thus effectively achieved but can only be monochrome, which constitutes a severe limitation in certain applications. Moreover, the need to ensure that all viewers are equipped with specially designed eyeglasses is often prohibitive. Monochrome vision and the need to wear special glasses are also major handicaps in methods for producing similar images by electron-beam scanning. In television as in motion-picture projection, it is necessary at the time of restitution to separate the portion of image to be observed by the left eye from the portion of image to be observed by the right eye. More recently, it has been proposed to employ eyeglasses fitted with electro-optical lenses which are controlled so as to be opaque and transparent in alternate sequence and in opposition in order to observe images which are displayed in synchronism, namely those produced for the right eye and those produced for the left eye in alternate sequence. The pictures can accordingly be in color but this does not remove the disadvantage arising from the fact that viewers need to wear special glasses, if it is intended to obtain a relief effect. Furthermore, this technique entails the use of video scanning in two half-frames reserved respectively for the right-hand images and for the left-hand images and, since they are occulted in alternate sequence, this results in a not-negligible reduction in resolution.

SUMMARY OF THE INVENTION

The present invention makes it possible to overcome the disadvantages of prior art techniques and more particularly those which have just been recalled. Accordingly, the object of the invention is to provide a novel and original method which leads to a simple and attractive design in the field of amusement-hall games but also in the field of firing simulation. With this objective, the invention utilizes the distinctive properties of videodisks.

It is known that, in the specific field of videodisks, the successive video images are each recorded in turn in concentric circles having progressively variable radii. Furthermore, it is possible to synchronize the reading of two videodisks in rotational velocity with a very high degree of accuracy.

The method in accordance with the invention essentially consists in recording an animated scene, viewed simultaneously at two different angles, in the form of video signals on two videodisks which thus contain after recording a sequence of left-hand images and a sequence of right-hand images respectively, in also forming synthetic images or symbols in electronic form, and in restituting the animated images combined with the synthetic images in synchronism by means of two corresponding visual display monitors associated with means for reflecting the displayed images respectively to the left eye and to the right eye of a viewer.

A device in accordance with the invention for the practical application of the above method comprises a first and a second videodisk reader respectively for the restitution of a sequence of left-hand images and a sequence of right-hand images, means for synchronizing the speed of rotation of the two corresponding disks within the readers, means for initiating simultaneous startup of the two readers on one and the same image of the two sequences, two monitors respectively for display of the images restituted by the two readers, insertion means of a left-hand and right-hand type respectively associated with the two readers for inserting synthetic images or symbols in the left-hand and right-hand images restituted by the readers, and associated means for reflecting the displayed images respectively to the left eye and to the right eye of a viewer.

The signals corresponding to the synthetic images or symbols determined beforehand in order to define a shape and a position which are either stationary or moving in the left-hand and right-hand animated images are combined with the video signals restituted by the readers, with the result that the synthetic images or symbols are displayed by the monitors in superimposed relation or mixed with the animated images restituted by the corresponding readers.

In amusement-hall games, the device in accordance with the invention can advantageously be designed in such a manner as to ensure that the displayed animated images can appear at the same time, with relief for a principal viewer and in particular for a player but without relief for spectators who are standing by.

BRIEF DESCRIPTION OF THE DRAWINGS

Other features of the invention will be more apparent upon consideration of the following description and accompanying drawings, wherein.

DESCRIPTION OF THE PREFERRED EMBODIMENTS

Figure 1:
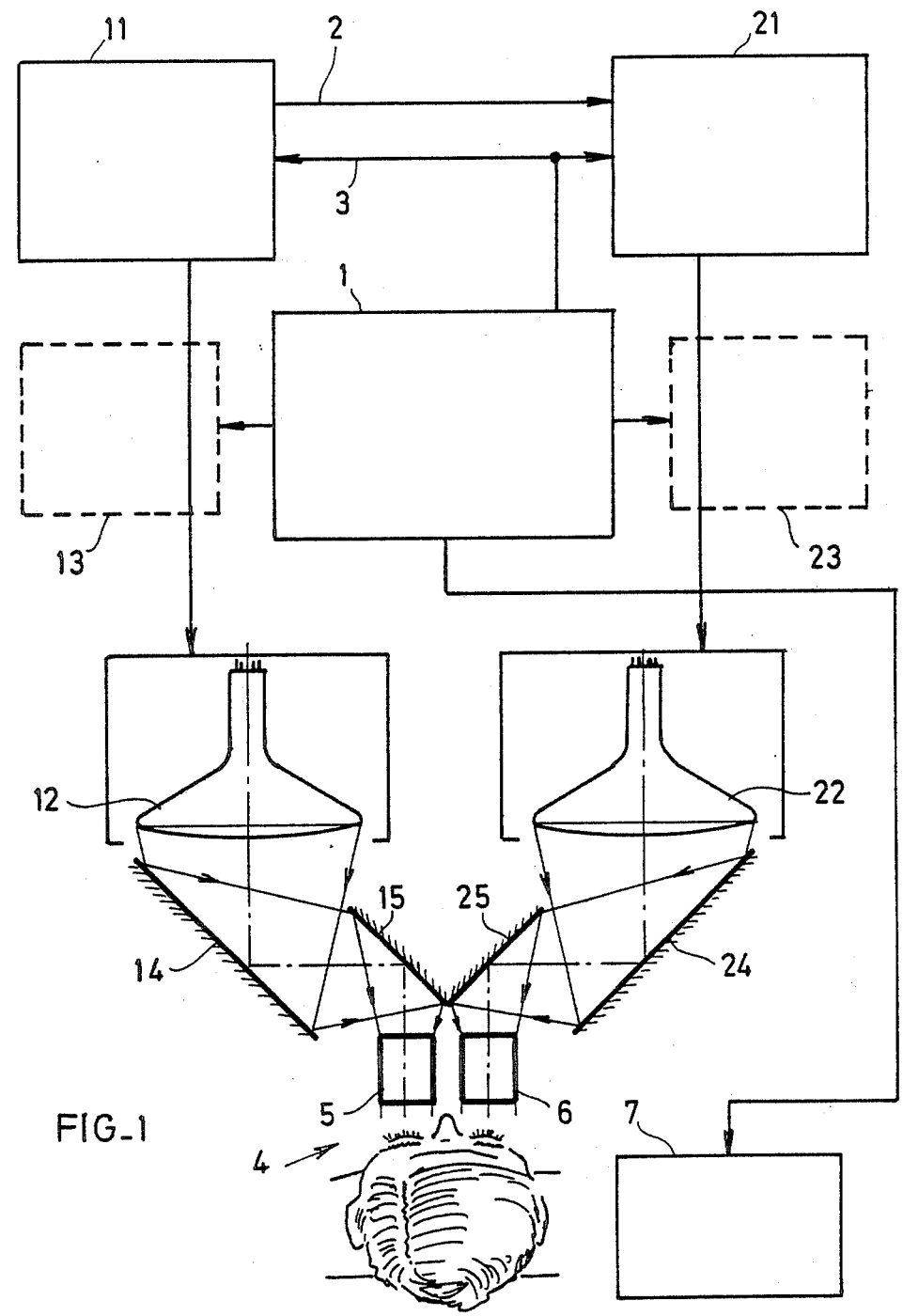
FIG. 1 constitutes the diagram of a first embodiment of the device in accordance with the invention with a reflecting system disposed around a single viewer.

As illustrated in FIG. 1, a device in accordance with the invention comprises two videodisk readers 11 and 21, and two monitors 12 and 22 which are associated with the readers and display on their respective screens the video images restituted by the corresponding readers. The speeds of rotation of the disks within the two readers are synchronized in order to remain continuously identical, the synchronization being ensured in a manner known per se. The internal mechanisms of the first reader 11 also serve to drive the disk within the second reader 21 (as indicated by the arrow 2). In addition, the two readers 11 and 12 are placed under the control of a digital computer 1 containing all the data and instructions which are necessary for operation of the device as a whole.

The disks introduced into the readers 11 and 21 contain a recording in the form of video signals, of two animated image sequences corresponding to the same scene viewed in stereoscopy. In other words, the corresponding shots of the same scene have been taken simultaneously by means of two video cameras, the scene being viewed by these cameras at two different angles. By way of example, the two cameras are spaced at a distance of approximately one meter in the case of a scene filmed at a distance of a few tens of meters.

The result achieved by the foregoing is that the images which are restituted by the readers 11 and 21 and displayed on the screens of the monitors 12 and 22 are stereoscopic animated image sequences corresponding respectively to the left eye and to the right eye of one and the same observer. It is assumed in FIG. 1 that the reader 11 is reserved for the disk of the sequence of left-hand images and that the reader 12 is reserved for the disk of the sequence of right-hand images. It will clearly be understood that the disks can contain a number of sequences of different successive scenes.

As indicated by an arrow 3 in FIG. 1, the readers are controlled by the computer 1 so as to start-up simultaneously on the same image of their respective sequences, this condition being readily checked with high precision in the case of videodisks. It is also apparent from FIG. 1 that the same computer 1 equipped with suitable electronic interfaces ensures the operation of two insertion devices 13 and 23 which are associated respectively with the two readers. In accordance with known practice, these devices serve to insert in the images restituted by the readers synthetic images or symbols representing, for example, objects or targets at which the viewer is expected to aim. The viewer may in particular be a player stationed in front of an amusement-hall console or else an operator who is controlling a firing operation or sequence in a firing instruction simulator.

The items of information which characterize these symbols or images, both in their intrinsic shape and in their position with respect to the scene in which they appear and in any movements which they may perform, are supplied by the computer which determines them from previously recorded rules and data in accordance with a technique which is conventional and known per se. However, the insertion operation is carried out in such a manner as to initiate the appearance of said symbols or images with a relief effect. To this end, the items of information which provide the insertion instructions are determined differently by the computer for the two insertion devices associated respectively with the left-hand reader and the right-hand reader in such a manner as to ensure that the image inserted by the left-hand reader corresponds to the viewpoint of the left-hand image and that the image inserted by the right-hand reader corresponds to the viewpoint of the right-hand image. In other words, the inserted images are restituted on the left-hand side and on the right-hand side as they would be seen with the same angular spacing as the images restituted by the readers.

In order to reconstitute the relief effect, the two sequences of images which are visible on the screens simultaneously are observed respectively through the two eyepieces of an optical sight 4. Two symmetrical optical reflection systems consisting of total reflection mirrors designated on one side by the references 14 and 15 and on the other side by the references 24 and 25 transmit the left-hand images derived from the reader 11 and the monitor 12 to the left-hand eyepiece 5 of the optical sight and the right-hand images derived from the reader 21 and the monitor 22 to the right-hand eyepiece 6.

A control keyboard which is usually provided with a hand lever is placed within easy reach of the user and enables him to transmit instructions to the computer. The user can thus control a simulated projectile and thus aim at targets as they appear on the scene which is displayed in stereoscopy. It is worthy of note in this connection that, whether the fire simulation device is intended for games or for training in the handling of weapons systems, a considerable improvement in the device is achieved by the present invention. This improvement lies in the possibility of estimating or measuring the distance of objects located in a natural landscape environment.

Figure 2:
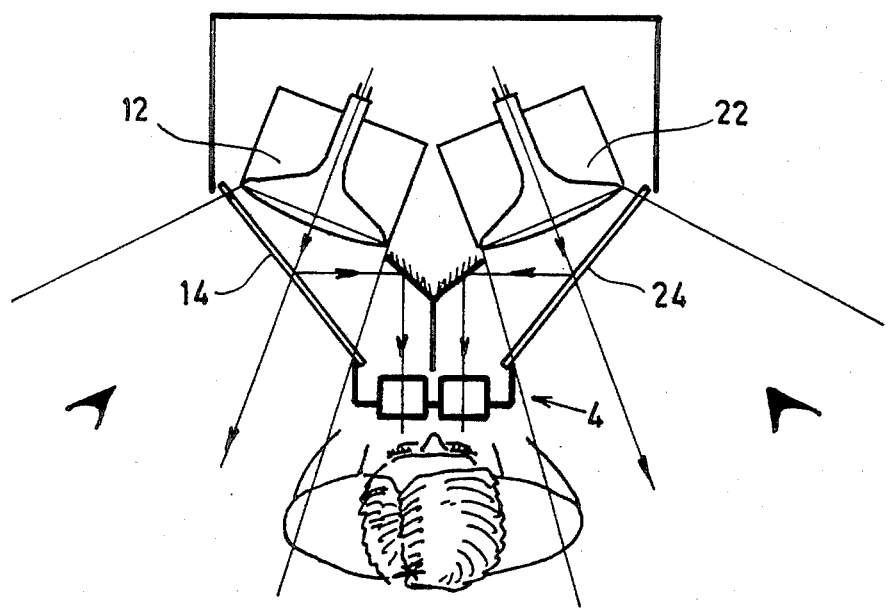
FIG. 2 is a schematic diagram of a second embodiment in which visual display is provided both with and without relief.

In FIG. 2, there is shown diagrammatically an alternative embodiment of the device which is particularly well suited for an amusement-hall game. There have been shown in this figure only the arrangements which differ from the embodiment illustrated in FIG. 1 in regard to visual display and observation of the sequences of restituted animated images. It is apparent that the screens of the monitors 12 and 22 are placed obliquely in divergent directions and that the mirrors 14 and 24 are of the semi-reflecting type. In consequence, the optical reflection systems transmit the respective images to the left and right eyepieces of the optical sight 4 as in the previous embodiment but, in addition, the same images are visible to spectators who are standing by, the left-hand images being visible at a left-hand side of the optical sight whilst the right-hand images are visible at a symmetrical angle on the right-hand side of the optical sight. The use of the optical sight may remain reserved for a single "player" who is the only person to benefit by a relief effect.

As has already been pointed out, the particular features of the embodiments hereinabove described do not imply any limitation and have been given solely by way of example. Thus all alternative forms and all functional equivalents of the means described in the foregoing remain within the scope of the invention.

What is claimed is:

1. A method for recording real animated images and restituting the same in combination with synthetic images inserted therein, comprising the steps of recording an animated scene, viewed simultaneously at two different angles, in the form of separate video signals each on a different one of two videodisks which thus contain after recording a sequence of left-hand animated images and a sequence of right-hand animated images respectively; forming synthetic images or symbols in electronic form; restituting said animated images from said video signals in combination with the synthetic images converted from said electronic form thereof in synchronism as respective visual display images on two corresponding visual display monitors; and reflecting the display images respectively to the left eye and to the right eye of a viewer.

2. A device for creating stereoscopic animated images on the basis of video signals respectively representative of real animated images of an animated scene viewed simultaneously at two different angles and recorded as a sequence of left-hand animated images on one videodisk and as a sequence of right-hand animated images on another videodisk, comprising a first and a second videodisk reader respectively for the restitution of the sequence of left-hand images and the sequence of right-hand images from the respective video signals recorded on the one and on the other videodisk, insertion means of a left-hand and of a right-hand type respectively associated with the two readers for inserting synthetic images or symbols in the left-hand and right-hand images restituted by the readers, means for synchronizing the speed of rotation of the two corresponding disks within said readers, means for initiating simultaneous startup of the two readers on one and the same image of the two sequences, two monitors respectively for display of the images restituted by the two readers, and associated means for reflecting the displayed images respectively to the left eye and to the right eye of a viewer.

3. A device according to claim 2, wherein said synthetic images or symbols are predetermined so as to fall into the left-hand class and the right-hand class in order to correspond to the left-hand and right-hand viewpoint with the same angular spacing as the images restituted by the readers respectively.

4. A device according to claim 3, further comprising an optical sight including a left-hand and a right-hand eyepiece; wherein said monitors comprise visual display screens which are oriented obliquely in divergent directions; and wherein said reflecting means comprise symmetrical semi-reflecting mirrors for allowing transmission of the images of the associated monitors on each side of said optical sight for separate viewing and also reflection of the images respectively to said left-hand and right-hand eyepieces for stereoscopic viewing.

5. A method of recording and sterreoscopically restituting animated video images, comprising the steps of recording an animated scene, viewed simultaneously at two different angles, in the form of video signal sequences, on two videodisks which thus contain after recording a sequences of left-hand images and a sequence of right-hand images respectively; synchronizing the speed of rotation of the two videodisks; initiating simultaneous startup on one associated image of the two sequences; restituting the sequences from said video signals recorded on the two videodisks, including separately displaying visual images corresponding to such sequences on corresponding visual display monitors; and reflecting the displayed visual images respectively to the left eye and to the right eye of a viewer.

* * * * *